United States Patent
Jakobsson

(10) Patent No.: US 8,286,225 B2
(45) Date of Patent: Oct. 9, 2012

(54) METHOD AND APPARATUS FOR DETECTING CYBER THREATS

(75) Inventor: Bjorn Markus Jakobsson, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 677 days.

(21) Appl. No.: 12/537,796

(22) Filed: Aug. 7, 2009

(65) Prior Publication Data

US 2011/0035784 A1    Feb. 10, 2011

(51) Int. Cl.
*G06F 7/04*    (2006.01)

(52) U.S. Cl. .......................................................... 726/5

(58) Field of Classification Search ........................ 726/5
See application file for complete search history.

(56) References Cited

U.S. PATENT DOCUMENTS

2004/0111621 A1*   6/2004   Himberger et al. ........... 713/182
* cited by examiner

*Primary Examiner* — Jacob Lipman

(74) *Attorney, Agent, or Firm* — Shun Yao; Park, Vaughan, Fleming & Dowler LLP

(57) ABSTRACT

A method and apparatus for detecting cyber threats using reinforced cookies, which include HTTP cookies, history cookies, cache cookies and/or other types. A history cookie comprises an entry for a particular web page in a browser's navigation history. A cache cookie comprises an entry for a particular object (e.g., an image file) within a browser's cache. Upon a client's first visit to a web server, an identifier record is generated comprising data such as a user ID, a client device ID, an age (e.g., a counter), a cookie type, an authentication field, etc. From the unique identifier, one or more types of reinforced cookies are generated and stored with the client browser. On a subsequent visit, the client's cookie configuration is examined to determine whether the client may be the perpetrator or victim of a cyber attack. Cookies may be updated or replaced on some or all visits.

23 Claims, 6 Drawing Sheets

METHOD AND APPARATUS FOR DETECTING CYBER THREATS

BACKGROUND

This invention relates to the field of computer systems. More particularly, a method and apparatus are provided for detecting various types of cyber threats.

Cyber threats are a given in today's computing environments. Although some types of threats, such as viruses, worms and denial of service attacks seem to receive the most publicity, many other types of threats exist, having a wide range of severity and ease of detection.

For example, several threats involve the use of cookies stolen from a victim's computing device or intercepted in transit. Traditional cookies are textual name-value pairs that a browser stores on a user's computing device when the browser visits a web site that uses cookies. These types of cookies are sometimes called browser cookies or HTTP (Hyper Text Transport Protocol) cookies, and a site may store virtually any number of them on a user's computing device.

Browser cookies are typically used to provide information regarding a user or computing device across multiple visits to the web sites that originated the cookies. Thus, a browser cookie may be stored on the computing device the first time a user visits a particular web site, and may contain a session identifier, a username, an IP (Internet Protocol) address of the computing device, a random string or any other value. When the user returns to the web site in a later browser session, the browser automatically sends the cookie to the site. The cookie's content may be used to identify the user, personalize the web page it presents based on the user's preferences, load a shopping cart with items previously selected by the user, etc.

Other information stored by a browser may be used in a manner similar to a traditional browser cookie. For example, a browser's history keeps track of web sites (e.g., by URL (Uniform Resource Locator)) the browser visits. A given site can then query or probe a user's browser to learn whether the browser has visited a target web site.

Not all sites in the browser's history may actually have been viewed by the user, because a given web page or other collection of program code (such as HTML (Hyper Text Markup Language)) presented by the browser may have ordered the browser to open a site in a frame that a user does not actually see (e.g., an HTML IFrame). This allows the source web site to plant information of its choice in the browser history. Because the browser history can provide tracking information similar to a browser cookie, an entry in a browser history could be termed a "history cookie".

Similarly, a browser typically caches various objects (e.g., icons, logos, other images, links) for possible reuse, to avoid having to download them multiple times. A page sent to a browser from a web site may include any number of cacheable objects. By observing which objects the browser does not download in order to present that page, the web site can determine which objects the browser already has in its cache. Some of those objects may be "web bugs"—invisible or tiny (e.g., 1 pixel by 1 pixel) objects that a user may not realize are being displayed by her browser.

Because a given object may be very specific, meaning that it is only downloaded from one source or a limited number of sources, the web site can determine that the browser likely has or has not visited a source. Therefore, a particular object in a browser cache (or even the lack of the particular object) may be considered a "cache cookie" and be used to track or determine a user's browsing activity.

Each of these types of cookies—a traditional cookie, a history cookie and a cache cookie—may be generated in two or more forms, which may reflect the manner in which the source or associated web site or object is identified. For example, a domain-based cookie identifies the source or associated web site by a URL (e.g., www.example.com). An IP-based cookie identifies the site by an IP address (e.g., 192.168.1.1).

Several types of cyber threats involve the theft or interception of cookies, which may then be used to allow a malicious actor to masquerade as the victim. A cookie thief may be able to pose as a valid user to a target web site and obtain data or access to information that he or she would not otherwise have been able to access.

For example, after a valid user logs into a network-based electronic mail service (e.g., with username and password), that site may store on the user's computing device a cookie that uniquely identifies the user. When the user later returns to the site, the user's browser automatically sends the cookie and (if it matches what the site stored as the cookie), the site may give the user immediate access to her mail without logging in again.

However, if an attacker is able to appropriate the cookie after it is stored, and stores it in his browser, he could then visit the site and get immediate access to the victim's electronic mail. He could then read her private correspondence, maybe learn a password that was sent to the user from a social networking page or other site, masquerade as the user by sending a message requesting sensitive information, etc.

A basic cookie theft may involve pilfering one or more of a user's traditional cookies (domain- and/or IP-based) from her browser, possibly via malware implanted on her computing device, by interception with a packet sniffer program, through cross-site scripting, via physical access to the device, and/or other methods.

A different type of attack on a user's browser is termed "DNS Poisoning," and involves corrupting DNS (Domain Name Service) information to cause a user's browser to visit a site or web page other than one it is trying to visit. This may allow the attacker to obtain one or more of the user's domain-based cookies.

More particularly, when a browser is directed to a given site by URL (e.g., www.example.com), which identifies the site's domain (i.e., example.com), a DNS lookup is performed to find the actual address (e.g., IP address) that corresponds to the URL. This lookup may be executed at multiple locations before finding an answer—such as within the user's browser, within a wireless access point via which the user's computing device accesses the internet, in one or more servers at the user's ISP (Internet Service Provider), etc. If a malicious actor changes the DNS data at one of these locations, or manages to return a response to the DNS lookup in place of the normal mechanism, the response may identify the IP address of a malicious site instead of the desired web site.

When the user's browser receives the incorrect IP address, it cannot know that it is invalid, and will therefore navigate in a normal manner to the specified address. Because the browser believes the site to be genuine, it will automatically transmit to the malicious site any traditional domain-based cookies it has for that site.

Yet another cyber threat, termed "machine cloning," allows an attacker to obtain all of a user's browser information, including all domain-based and IP-based traditional cookies, history cookies and cache cookies, as well as private and public cryptographic keys and other data. Machine cloning involves cloning or copying all of a victim's computing device, or at least all relevant data.

Because the attacker now has a virtual twin of the victim's device, his browser can produce traditional cookies and respond appropriately to any probes or queries regarding history cookies and cache cookies.

In light of the number and types of cyber threats, there is a need for a method and apparatus for reliably distinguishing between legitimate and nefarious user activity, configurations and connection requests.

SUMMARY

In embodiments of the invention, methods and apparatus are provided for detecting cyber threats involving misappropriation of a valid user's cookies.

In these embodiments, reinforced cookies are served to a client computing or communication device for storage by a client browser. The reinforced cookies may include traditional HTTP (Hyper Text Transport Protocol) cookies, history cookies and/or cache cookies. From the following descriptions of these embodiments of the invention, other embodiments may be readily developed for other types of cookies that may be hereafter implemented or developed.

Reinforced cookies are derived from a unique identifier that is associated with a specific user and that comprises data such as a user ID, a client device ID, an age (e.g., a counter or version of the identifier), a cookie type, an authentication value, etc. The unique identifier is used to encode any number of traditional, history and cache cookies.

For each type of cookie, multiple versions may be produced, such as domain-based (i.e., to identify the origin's domain, such as www.parc.com), address-based (i.e., to identify the origin's IP address), SSL (Secure Sockets Layer) (i.e., to generate a cookie only served during HTTPS sessions), etc.

Upon a subsequent visit to the same server, the client automatically reports any reinforced traditional cookies it possesses, and the server probes or queries the client to determine which, if any, history and/or cache cookies it possesses. The server analyzes the detected cookie configuration, to determine whether it may signal a cyber threat such as cookie theft, DNS (Domain Name Service) poisoning or machine cloning. In doing so, the server considers whether the observed configuration could be a valid configuration (e.g., a user may have cleared her browser of one or more types of cookies).

A method according to some embodiments of the invention may comprise serving a collection of reinforced cookies for storage during a first communication session with a first client computing device, receiving a request for a second communication session from a second client computing device purporting to be the first client computing device, and comparing a configuration of reinforced cookies on the second client computing device to configurations indicative of one or more cyber threats.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, methods and apparatus are provided for detecting some cyber threats or attacks, particularly those that involve use of cookies (traditional HTTP cookies, history cookies or cache cookies) that have been obtained illicitly and that can be mistaken for valid user activity. Specific cyber threats and attacks that may be detected include theft of traditional cookies, DNS (Domain Name Service) poisoning and machine cloning.

Figure 1:
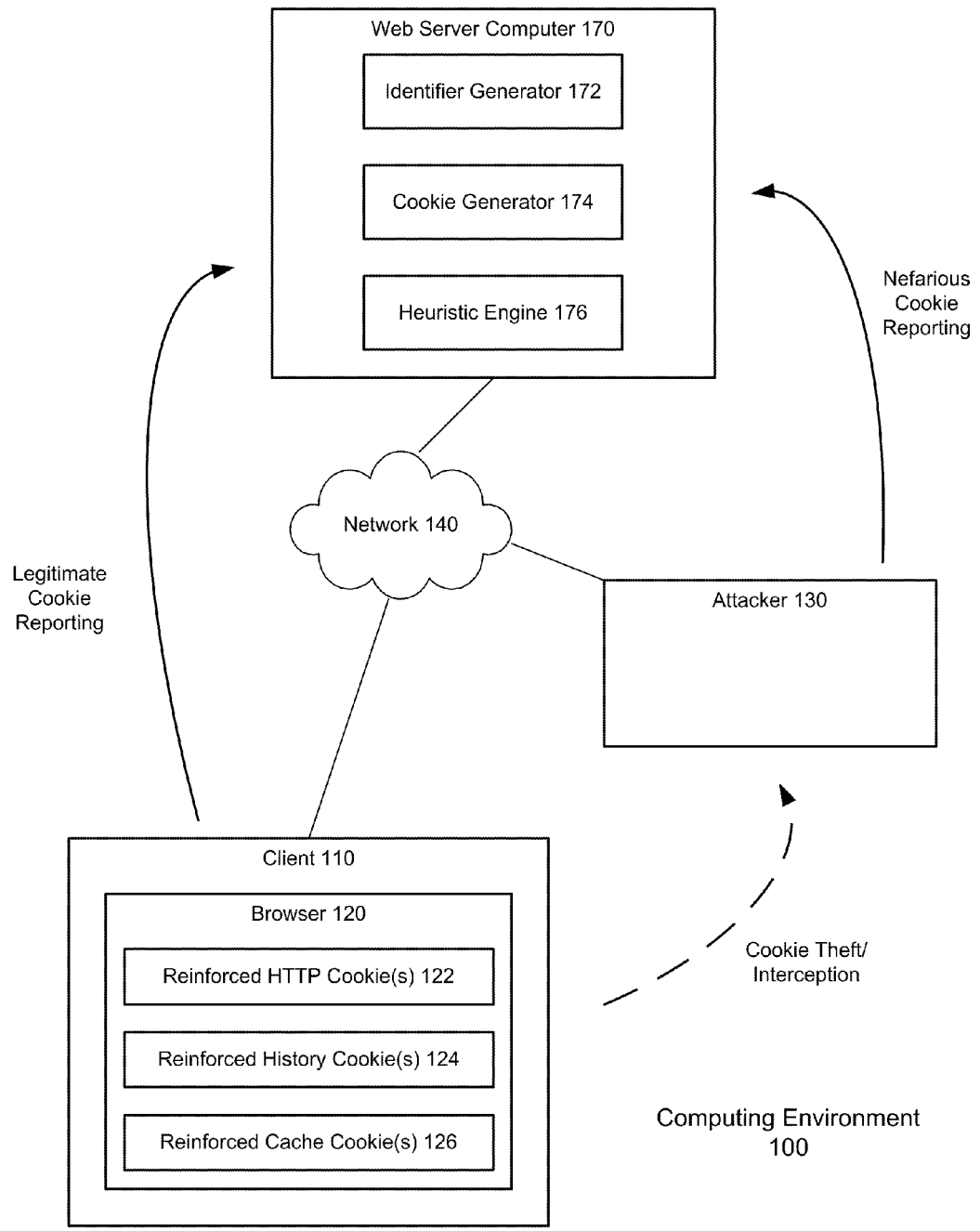
FIG. 1 is a block diagram depicting a computing environment for detecting cyber threats, according to some embodiments of the present invention.

FIG. 1 is a block diagram of a computing environment in which an embodiment of the invention may be implemented.

Computing environment 100 comprises client 110, potential attacker 130 and web server 170. These entities are coupled via network 140 (e.g., the Internet, an intranet) and/or other communication links.

Client 110 comprises browser 120, which is configured to store reinforced HTTP or traditional cookies 122, reinforced history cookies 124 and reinforced cache cookies 126. Each type of cookie may include either or both domain-based variations (which identify the domain of the cookie originator, such as www.parc.com) and address-based variations (which identify the IP address of the cookie originator, such as 123.456.7.8). Thus, in some embodiments of the invention, up to six different types/variations of cookies may be stored with a client's browser.

In yet other embodiments of the invention, other variations of a cookie may be employed. For example, one or more of cookies 122, 124, 126 may also be generated for SSL (Secure Sockets Layer), in which case they are only transmitted during secure HTTPS session.

Client 110 may comprise virtually any type of computing or communication device capable of executing a browser, including laptop and desktop computers, mobile telephones, and other devices now know or hereafter developed. Browser 120 may be any type of browser capable of storing the various types of cookies, and may be relatively "thin" (e.g., if operating on a mobile telephone) or robust (e.g., if operating on a desktop computer system).

Attacker 130 may similarly comprise virtually any type of computing or communication device. The attacker may implant malicious software on client 110 (e.g., a virus, a rootkit, a keystroke logger) to aid in the theft of cookies, may execute a packet sniffer to intercept the cookies in transit across network 140 or some other communication link, or may take other action to obtain cookies associated with client 110.

Web server 170 is a computer server configured to execute web server software, and may host or provide access to any number of web sites and web pages to client 110. For purposes of current embodiments of the invention, web server 170 executes identifier generator 172 to generate unique identifier records for clients, cookie generator 174 to generate one or more types of cookies (based on a unique identifier), and heuristic engine 176 for examining a client's cookie configuration and determining whether the entity is likely to be a valid user or a malicious actor.

More specifically, based on the configuration of reinforced cookies present or not present on the connecting entity, web server 170 (heuristic engine 176) may determine that cookies of a client (e.g., client 110) have or have not been compromised.

In some embodiments of the invention, different cookie generators 174 may be operated to produce different types/variations of cookies, and different heuristic engines may be configured to consider or test for different types of cyber threats.

Also, in some embodiments of the invention, functionality associated with web server 170 in FIG. 1 may be divided among two or more servers. For example, one web server or computing device may be configured to generate and/or serve reinforced cookies to a client, while a second web server or computing device may be configured to receive cookies from a client and/or examine that client's cookie configuration to determine if it is representative of a cyber threat or attack.

The various types of cookies stored on client 110 are considered "reinforced" because they comprise data beyond a simple name-value pair (for a traditional cookie) or URL (for a history cookie) or filename (for a cache cookie). The additional data may vary from one embodiment of the invention to another, and may illustratively comprise one or more of the following:

an ID for identifying a user or organization;
a device ID for identifying a specific computing or communication device used by a particular user or organization;
a browser ID for identifying a type of browser;
an age for indicating an age or version of the cookie;
a type for identifying the cookie's type; and
an authentication value for facilitating authentication of the cookie.

Any or all of these data may be used in the generation of a set of reinforced cookies. Yet other data not traditionally included in cookies and not listed above may be employed in other embodiments.

When a client or other entity that does not possess any reinforced cookies connects to web server 170, an ID is generated to identify the user (or organization) believed to be making the connection. This identity may be based on login information provided by the connecting user, one or more existing cookies passed to the server, and/or other information. Similarly, information for identifying a particular computing/communication device or browser may also be received during the connection.

Separate ID values may be employed to identify a user's specific computing device, a browser executed on that device, a client IP address (or other network address), etc. Alternatively, a given ID value may be applied for a user across all client devices, browsers and other resources operated by the user.

An age value, such as a counter, may be initialized during the first connection and, as described below, will be updated during subsequent connections. An age value may be omitted in an embodiment of the invention in which a different field is regularly updated and can be used to identify a cookie's version, issue date or other age characteristic. For example, each time the cookies are refreshed, the ID field may be updated according to a numerical or alphanumerical progression, so that a cookie's age can be readily determined by a server.

The type value may be used to identify a particular type of reinforced cookie. Illustratively, different embodiments of the invention may implement any or all of: a domain-based HTTP cookie, an address-based HTTP cookie, a domain-based history cookie, an address-based history cookie, a domain-based cache cookie and an address-based cache cookie. Yet other embodiments may employ other types of cookies now know or hereafter developed. For example, some reinforced cookies may have additional versions provided only in SSL (Secure Sockets Layer) or TLS (Transport Layer Security) communication sessions.

An authentication value may be generated for a cookie in order to facilitate its verification or authentication when the same entity establishes another connection with the web server. Illustratively, the authentication value may comprise a hash, a keyed hash, a random or specific value associated with the user, a checksum, a digitally signed value or other value or cryptographic token derived from any or all of the other figures being used as input to the cookie-generation process.

Any or all of these data values are generated during the client's visit, and corresponding cookies are generated and passed to the client browser for storage. The server may also store each individual cookie, or may just store the data values, which will allow the server to re-generate the cookies in the future as needed (e.g., to compare against cookies received from the client).

In some embodiments of the invention, the data values used to generate a client's set of reinforced cookies is maintained as a unique identifier record (generated by identifier generator 172). Thus, from the assembled data values, the unique identifier is assembled and used (by cookie generator 174) to generate the client's reinforced cookies.

When the same client re-connects to web server 170 for another transaction, it automatically reports its reinforced traditional cookies, both domain-based and address-based. Web server 170 then probes the connecting entity for the reinforced history and cache cookies. The several cookies are compared against the cookies as provided most recently to the client.

If all cookies are present and pass inspection, web server 170 updates one or more of the data values, or generates entirely new values, and passes the client updated reinforced cookies. For example, the server may update the age value for each cookie (and the authentication value).

However, if one or more cookies are missing or do not match what the server expects, heuristic engine 176 applies a set of rules to determine whether the observed cookie configuration is likely due to acceptable user activity (e.g., clearing HTTP cookies, clearing a history file, clearing cache contents, restoring a previous machine configuration) or possible nefarious activity (e.g., cookie theft, DNS poisoning, machine cloning).

Auxiliary information, such as user history, transaction information (e.g., metadata received with a connection request), threat level, known current attacks, and so on, may be taken into consideration when determining whether a particular cookie configuration is likely to be innocuous or insidious. This determination may result in a score associated with the transactions, and different servers calculating or inspecting this score may have different policies regarding how to proceed.

Possible outcomes include accepting the transaction, accepting and flagging it, rejecting the transaction, requiring additional authenticating data, or any combination of these. Flagging a transaction may result in additional security measures being taken.

Figure 2:
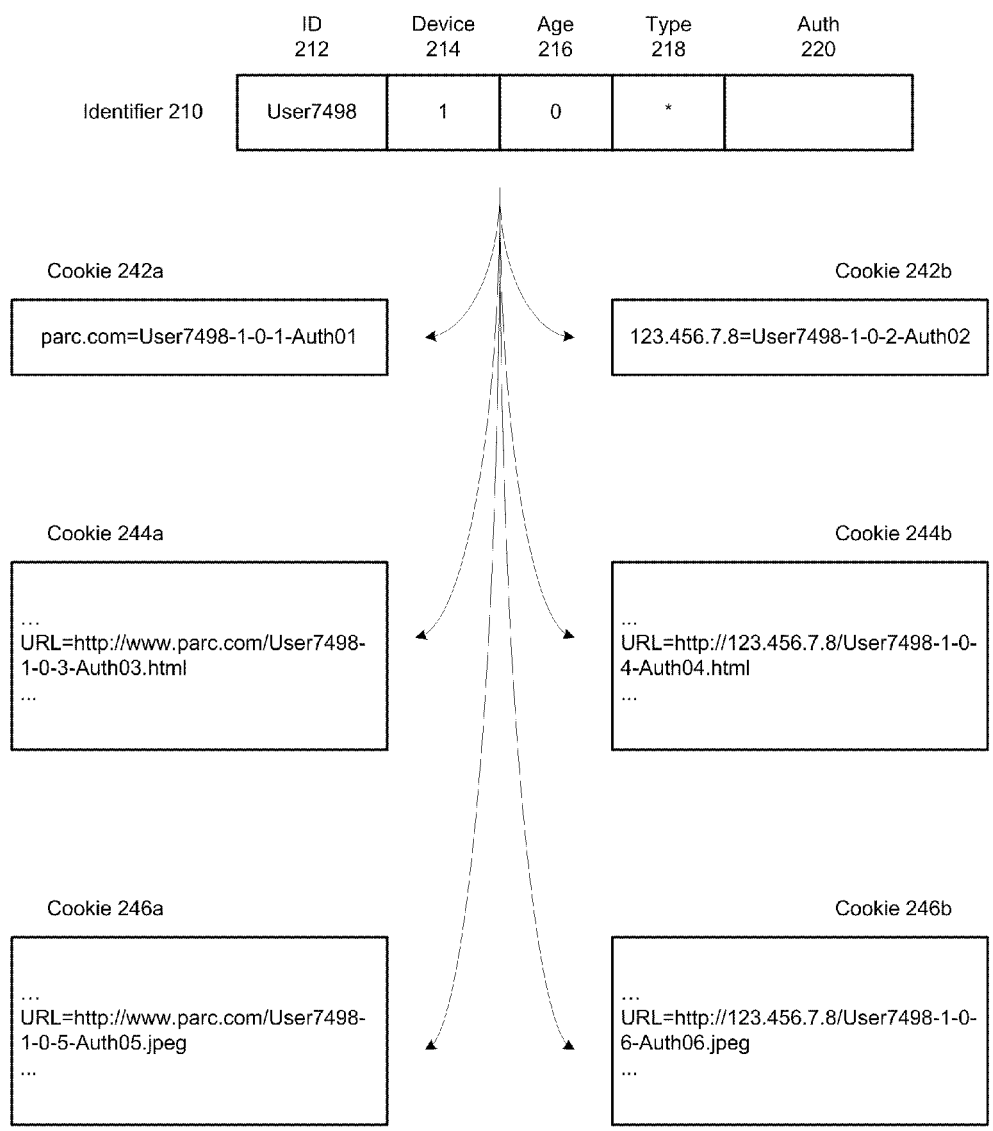
FIG. 2 depicts a set of reinforced cookies with which ambiguous cyber threats may be more reliably identified, according to some embodiments of the present invention.

FIG. 2 illustrates an assembly of non-traditional cookie data, and a set of reinforced cookies that may be generated from such data, according to some embodiments of the invention. In these embodiments, the set of data to be used to generate one or more cookies is assembled as an identifier record.

In FIG. 2, identifier 210 comprises five data fields: ID field 212, device field 214, age field 216, cookie type field 218 and auth field 220; in other embodiments of the invention, more or fewer fields are used. ID field 212 comprises a unique identifier of a user (e.g., User7498), and device field 214 comprises a unique identifier of a particular computing/communication device associated with User7498.

The device field allows web server 170 to account for multiple different devices that the user may employ to view content via the web server (e.g., a desktop computer, a laptop computer, a mobile telephone). In the illustrated implementation, the device field comprises a server-generated index that is incremented for each subsequent device discovered to be used by the user, and thus is equal to 1 in FIG. 2. In other implementations, device field 214 may comprise an IP (Internet Protocol) address of the device, a MAC (Medium Access Control) address, a machine name, a serial number or other value.

Device field 214 may be omitted in embodiments of the invention in which a single identifier record may be applied for a user for all client devices the user may operate.

Age field 216 functions as a counter initialized to the value 0 to indicate that this is the initial identifier assembled for User7498 and device 1. When the user returns to web server 170 in the future, with the same device, the age field will be incremented.

Cookie type field 218 comprises a wild card (i.e., "*") to indicate that the type field will be customized for each individual cookie generated from identifier 210. Alternatively, identifier 210 could comprise multiple separate identifiers, each having a specific value for the type field, in which case each identifier would be used to generate just one cookie.

Auth field 220 is calculated based on all other identifier fields, but is empty in identifier 210 because it will be calculated individually for each separate reinforced cookie. Thus, the auth value for each cookie will depend on type field 218, which is populated when the individual cookies are generated. In some alternative embodiments, such as those in which a separate identifier is assembled for each cookie type, or in which the auth field does not encompass the type field, auth field 220 of identifier 210 would comprise a suitable hash, checksum or other verifying value.

Identifier record 210 may alternatively be termed an identifier template, because one or more fields are dynamically set or configured when the reinforced cookies are generated.

Cookies 242*a*, 242*b*, 244*a*, 244*b*, 246*a*, 246*b* represent six reinforced cookies that may be generated from identifier 210. In these examples, the contents of identifier 210 are encoded in each cookie in an easily decipherable format (e.g., clear text). In other embodiments of the invention, one or more fields may be scrambled, encrypted or otherwise obfuscated.

Cookies 242*a*, 242*b* are traditional HTTP cookies. Cookie 242*a* is a domain-based HTTP cookie and comprises a name-value pair comprising the domain of web server 170 (e.g., parc.com=User7498-1-0-1-Auth01). Cookie 242*b* is an address-based HTTP cookie and comprises a name-value pair comprising an IP address of the web server (e.g., 123.456.7.8=User7498-1-0-2-Auth02).

The values of cookies 242*a*, 242*b* are encoded from identifier 210. It may be noted that the type fields of the two HTTP cookies are 1 and 2, respectively, and that Auth01 and Auth02 represent auth field 220 and may be of any size.

Because a given web server application, web page or web site may be hosted on multiple computer servers, domain-based cookie 242*a* may be generated with the identical name across all those servers, but the name of address-based cookie 242*b* will depend upon the IP address of a single, specific server.

Cookies 244*a*, 244*b* are reinforced history cookies related to a user (or browser's) navigation history. Cookie 244*a* is a domain-based history cookie, with a cookie type of 3, and cookie 244*b* is an address-based history cookie with a cookie type of 4.

A history cookie comprises a particular entry (or lack of a particular entry) in a history file, which indicates that the user has (or has not) navigated to a corresponding site since the history was last cleared or purged. History cookies 244 are set or loaded on a client via an HTML document, an XML (eXtensible Markup Language) document, a PHP (Hypertext Processor) script, a Javascript file, or some other document containing code that causes a browser to load a different page. Yet other methods of setting and/or reading a cookie, different from those described herein, may be implemented without exceeding the scope of the present invention.

In particular, to set cookies 244 on a client device, the HTML (or other) document is loaded, and then parsed or executed by a browser. The HTML document comprises code that causes the browser to request a specific target page (from the same server or an associated server). The name of the target page is encoded from identifier 210—for example, http://www.parc.com/User7498-1-0-3-Auth03.html for domain-based history cookie 244*a*.

When web server 170 receives the request for the specific target page, it recognizes that the page is being requested in order to configure a history cookie, and may or may not actually serve the page, as long as the page name is stored in the browser's history. If the page is actually served, it may be a null page, an IFrame, or contain minimal content.

The request may be identified as a request to set a history cookie by the unique form of the page name, by the fact that it is requested immediately after the cookie is sent to the client, or in some other manner. Because cookies 244 are generated from an identifier record unique to the current user, the name of the target page will be unique to the user.

Cookies 246*a*, 246*b* are reinforced cache cookies related to a user (or browser's) cache. Cookie 246*a* is a domain-based cache cookie, with a cookie type of 5, and cookie 246*b* is an address-based cache cookie with a cookie type of 6.

A cache cookie comprises a particular entry (or lack of a particular entry) in a browser cache. If the cache contains the entry, then the browser must have requested the associated object (e.g., an image, an audio file, a document) at some point since the cache was last cleared or purged.

As with the history cookies, cache cookies 246 are configured on a client via an HTML document, an XML (eXtensible Markup Language) document, a PHP (Hypertext Processor) script, a Javascript file, or some other document containing code that causes a browser to load or request a particular object. In FIG. 2, the requested object is ostensibly an image—specifically, a .jpeg file.

To load cookies 246 onto a client device, the HTML (or other) document is loaded, and then parsed or executed by a client browser. The HTML document comprises code that causes the browser to request the target object (from the same server or an associated server). The name of the target object is encoded from identifier 210—for example, http://123.456.7.8/User7498-1-0-6-Auth06./jpeg for an address-based cache cookie.

When web server 170 receives the request for the target object, it recognizes that the object is being requested in order to configure a cache cookie, and may or may not actually serve the object, as long as the entry is stored in the browser cache. If it does serve the requested object, the file may be empty or contain minimal data. Because cookies 246 are generated from an identifier unique to the current user, the name of the target page will be unique to the user.

FIG. 2 demonstrates embodiments of the invention in which each form of identifier 210 (i.e., for each type of cookie) is used to generate a single name-value pair, a name of a single HTML document, or a name of a single cacheable object. In other embodiments of the invention, multiple name-value pairs, target HTML documents and/or target cacheable objects may be generated.

Specifically, instead of encoding identifier 210 as a single string for each cookie (e.g., User7498-1-0-5-Auth05), a separate string may be generated for each field of identifier 210, or for some sub-combination of all fields. Thus, a cookie 242 may comprise separate name-value pairs for each field. Or, an HTML document sent to the client to configure a history cookie 244 or a cache cookie 246 may identify multiple target documents or target objects. In this case, the name of each document or object would correspond to a subset of all fields of identifier 210.

Figure 3A:
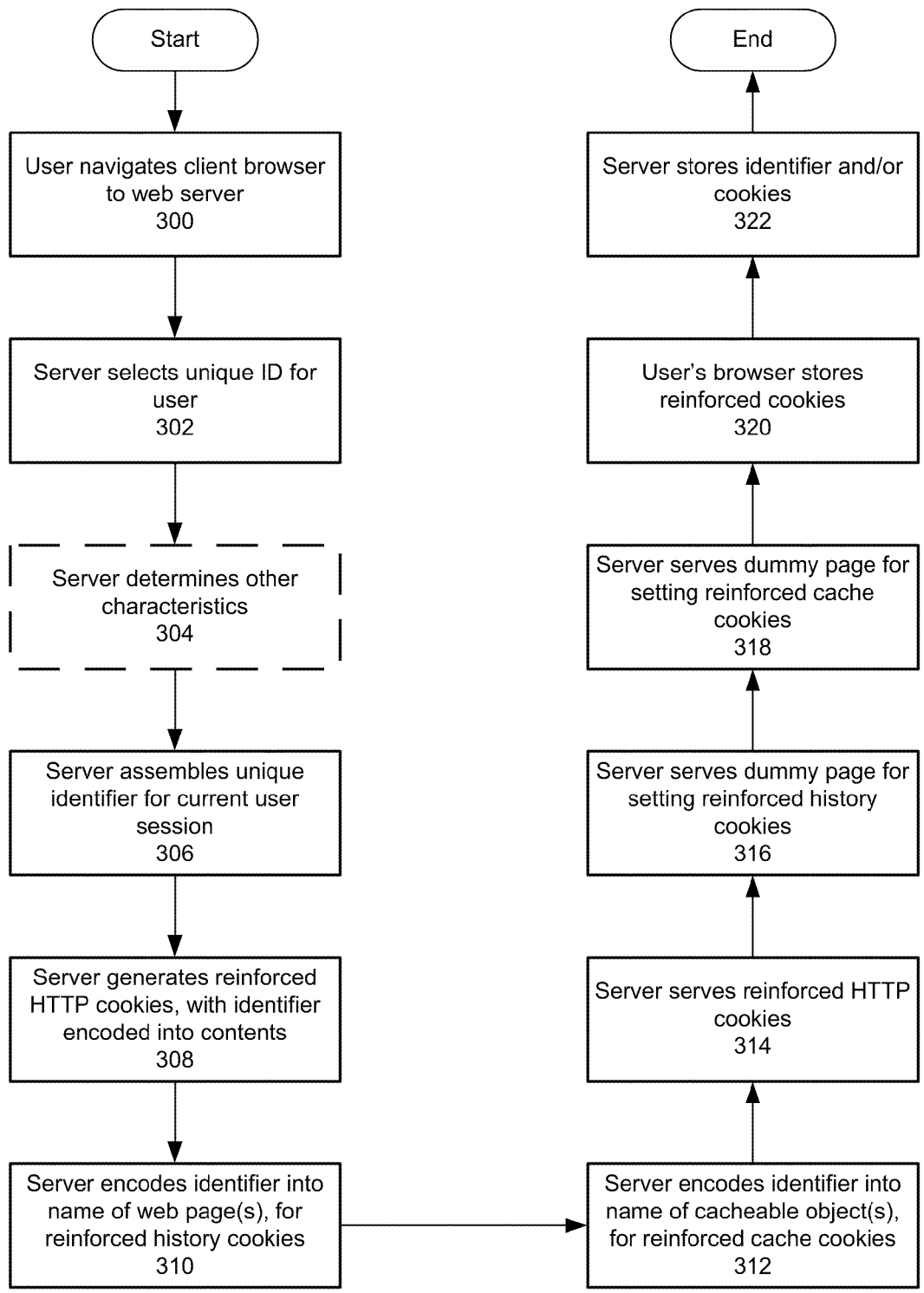
FIG. 3A is a flowchart illustrating a method of generating reinforced cookies to help detect a cyber threat, in accordance with some embodiments of the invention.
Figure 3B:
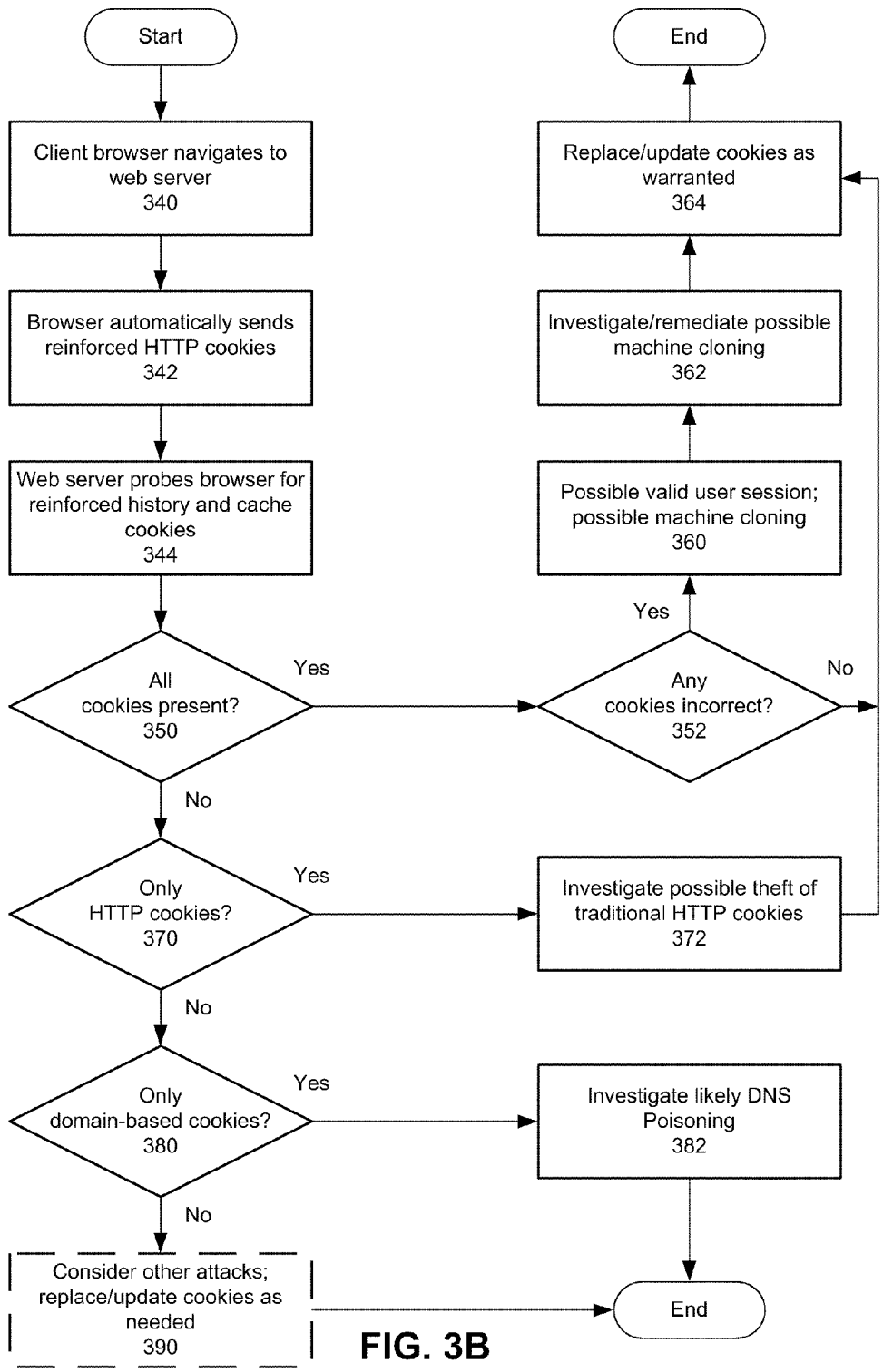
FIG. 3B is a flowchart illustrating a method of analyzing a client's configuration of reinforced cookies to help detect a cyber threat, in accordance with some embodiments of the invention.

FIGS. 3A-3B are flowcharts demonstrating a method of using reinforced cookies to detect certain cyber threats, according to some embodiments of the invention. FIG. 3A encompasses generation of a set of reinforced cookies, while FIG. 3B describes analyzing a client's configuration of reinforced cookies to determine if a cyber attack has occurred.

One of ordinary skill in the art will appreciate that the operations performed in the figures are merely illustrative. In other embodiments of the invention, the same or comparable operations may be performed in a different order. Further, a single operation may be divided into multiple operations, or multiple operations may be combined into one.

In operation 300 of FIG. 3A, a user navigates her client browser to a web server that employs reinforced cookies. The browser has no reinforced cookies associated with the web server, possibly because it is her first visit to a web page or web site hosted by the server, because it is her first visit since the server adopted the use of reinforced cookies, because it is her first visit using a particular computing device or browser, or for some other reason. For example, her computer system may have crashed and she has restored a previous system configuration that had no such cookies.

In operation 302, because it is the user's first visit to the web server, or first visit with a particular footprint (e.g., client computing device, browser, IP address, other identifying indicia), the server selects a suitable ID for the user. The ID may comprise or be derived from a username, an account number, an electronic mail address or other source, or may be generated anew.

In optional operation 304, the server may retrieve or elicit other characteristics of the user and/or her equipment, as desired, such as an identifier of her client device, her browser, her language, her network address, etc. In particular, the server will assemble any information it needs in order to generate a suitable and unique identifier record with which to encode a first set of reinforced cookies.

In operation 306, the server constructs an identifier record having any number of fields (e.g., such as identifier 210 of FIG. 2). In the illustrated embodiment, the identifier includes an ID field comprising the selected ID, an age field implemented as a counter, a type field to identify a particular type of cookie, and an authentication field comprising a checksum, hash or other value for verifying that the identifier or a cookie has not been altered.

In operation 308, the server uses the identifier to generate reinforced domain-based and address-based HTTP cookies. Illustratively, the respective names of the cookies will match the domain name and IP address of the server (or an associated server), and their values will comprise encoded forms of the identifier. Each cookie encompasses the same value for the ID and age fields of the identifier, but have different type and authentication values.

If the web server has multiple associated IP addresses (e.g., the web service is load-balanced among multiple physical servers), address-based reinforced HTTP cookies may be produced for any number of the associated IP addresses.

In some embodiments of the invention, the encoded values comprise clear-text strings of the identifier as formatted for the two cookie types. In other embodiments, the values may be obfuscated to some degree.

In operation 310, the server encodes the identifier into the names of two web pages, one that includes the web server's domain name and one that includes the web server's IP address (or other address). Illustratively, the page names may encompass the same ID and age fields, but different type and authentication values.

As described previously, the client browser will be instructed to load these pages in order to place the page names in the browser's history. The server may or may not actually possess web pages with these names, and may or may not actually serve them if they do exist, depending on whether it is necessary to do so in order for the browser to add the page names to its history.

Depending on restrictions for web page names, the page names used for the history cookies may be formatted differently than the values of the reinforced HTTP cookies. Specifically, the page names must not include illegal symbols or formats that might prevent them from being added to the history.

If the web server has multiple associated IP addresses, address-based reinforced history cookies may be produced for any number of the associated IP addresses.

In operation 312, the server encodes the identifier into the file names of two cacheable objects (e.g., image files), one that includes the web server's domain name and one that includes the web server's IP address (or other address). Illustratively, the file names may encompass the same ID and age fields, but different type and authentication values.

As with the history cookies, the client browser will be instructed to download these objects in order to create cache entries with the encoded object names. The server may or may not actually possess files having these names, and may or may not actually serve them if they do exist, depending on whether it is necessary to do so in order for the browser to add the object file names to its cache entries.

As with the web page names for the reinforced history cookies, file names of the cacheable objects may be formatted to avoid violating any applicable syntax or programming rules. Similarly, if the web server has multiple associated IP addresses, address-based reinforced cache cookies may be produced for any number of the associated IP addresses.

In operation 314, the web server serves the reinforced traditional HTTP cookies to the client browser. This may occur as the user session is commencing, or after the session has existed for a period of time.

In operation 316, the web server serves a dummy page comprising HTML, XML, Javascript or some other markup language or script language that instructs the client browser to load the two web pages encoded to act as reinforced history cookies. This causes the client browser to attempt to load the target web pages.

In operation 318, the web server serves a dummy page comprising HTML, XML, Javascript or some other markup language or script language that instructs the client browser to retrieve the two objects encoded to act as reinforced cache cookies. This causes the client browser to attempt to download the two objects.

In some embodiments of the invention, one dummy page may be served to carry out both operations 316 and 318.

In operation 320, the client browser stores the reinforced HTTP cookies, places the history cookie web pages in its history and enters the cache cookie objects in its cache.

In operation 322, the web server stores the identifier record and/or reinforced cookies that were served. Regarding the identifier, the server may store just the portion of the identifier common to all the reinforced cookies, or may store all variations of the identifier (e.g., with type and authentication fields that are unique to each type of cookie).

In FIG. 3B, a client connects or re-connects to the same web server, or an affiliated web server, at which time its cookie configuration will be examined to determine if the client is a valid client or may be a perpetrator or victim of a cyber attack such as cookie theft, DNS poisoning or machine cloning.

In operation 340, the client navigates to the web server. The web server may receive some indication of which user, client device or browser is connecting.

In operation 342, the client browser automatically reports the reinforced HTTP cookies that it possesses, if any. Depending on how the browser navigated to the server, or how the server identifies itself, the client may report either or both the domain-based and the address-based reinforced HTTP cookies.

If one or more reinforced HTTP cookies are not automatically received, the server may request them. For example, it may specifically identify itself (or an associated server) by IP address in order to prompt the client to send any reinforced address-based HTTP cookie(s).

In operation 344, the web server probes the client browser to determine whether it possesses the expected reinforced history and cache cookies. In some embodiments of the invention, the server knows which cookies the client should possess based on information regarding the user, client device and/or other characteristics received from the browser.

For example, the browser may send a user login name, an electronic mail address, or other indicia or unique identifier with its connection or transaction request. In some implementations, an IP address (or other address) of a client from which a request is received may be utilized.

Based on the received information regarding the user's browser state and/or data identifying the user's client, the server can determine which previously generated unique identifier corresponds to the user. As described previously, because a user may operate multiple client devices and/or browsers, one identifier may be associated with multiple user/device/other combinations, or multiple identifiers may be generated for the different combinations.

Depending on the type and form of the reinforced cookies, in operation 344, the web server may probe the client in different ways in different embodiments of the invention. In some embodiments, to determine whether a particular history cookie is present, the web server may simply query the client browser with the name of the web page used as the history cookie.

In other embodiments, the server may probe the browser for multiple potential history cookies, only some of which were actually served to the current client. The latter method helps detect an attacker that is masquerading as a client and has configured its browser to answer all history cookie probes affirmatively.

To probe for reinforced cache cookies, the web server may serve the client browser another dummy page that identifies the same cacheable objects that were used as cache cookies the last time the cookies were stored on the client. To avoid allowing a malicious actor to determine which specific objects were used as cache cookies, the dummy page may identify additional objects as well. Depending on which identified object(s) the client attempts to download, the web server can determine which of the reinforced cache cookies, if any, the client possesses.

Note that the server may periodically refresh a cache cookie on the client by again serving a page that references the related object(s). This may be done to promote longer retention of the cache entry. Instead of refreshing a current cache entry, the web server may generate and serve a new or update cache cookie to replace the current one.

The manner in which the web server proceeds from operation 344 depends on which, if any, of the reinforced cookies were produced by or found on the client, whether they are consistent (e.g., each having the same age or version) and whether they match what the server expected to receive (e.g., are not obsolete).

In operation 350, the server determines whether all six reinforced cookies were produced by or detected on the client. If so, the method continues at operation 352. Otherwise, the method advances to operation 370.

In operation 352, the web server determines whether any of the several reinforced cookies are invalid. For example, a cookie may differ in age (e.g., counter value) from another cookie, may comprise an incorrect type or wrong authentication value, or may fail in some other way to match what the server expected. If all cookies are correct, the current client is likely to be a valid user, and the method advances to operation 364 to update or replace the cookies, and then ends.

Otherwise, in operation 360, at least one cookie is incorrect, and the server must consider two possibilities—that an attacker was able to clone the true client device (in which case the current connection may be from the attacker masquerading as the victim, or may be the victim and be unaware of the successful attack), or that the client device suffered a system failure and had to restore an earlier system configuration (e.g., with older, obsolete cookies).

When a user is the victim of a machine cloning, most or all of the user's data settings (including cookies) are copied by an attacker and used to make a different computing device appear as the victim computing device. After the cloning occurs, either the victim or the attacker could connect to the web server without the web server being able to detect the attack, because whoever connects first after the cloning does so with a full set of valid cookies.

However, because a normal (non-threat) connection involves replacing or updating a client's reinforced cookies (in operation 364), the machine cloning incident can be detected as early as the second time an entity (the victim or the attacker) connects to the web server while appearing as the same client.

In particular, during the first connection after the cloning, the connecting client will receive updated reinforced cookies. When the other entity later tries to connect, the web server will arrive at operation 360 and determine that the current connection may be evidence of a machine cloning, even if it cannot immediately determine whether the current connection is from the attacker or the victim.

In operation 362, the web server may take action to try to determine whether the current connection is valid. For example, the server may require additional authentication by the client (e.g., username and password, digital certificate), which the attacker hopefully cannot satisfy. Or, the web server may take other action, such as initiating a suspension of all access to the target user account, terminating service to the current client, initiating a fraud alert, etc. If the current connection appears to be from the attacker, the illustrated method may end directly; otherwise, if the connection is found to be from the valid client, the method advances to operation 364.

In operation 364, all of the reinforced cookies are updated and returned to the client for storage. In some embodiments of the invention, updating the cookies may simply involve updating the age field of the identifier(s) (e.g., to increment a counter, to store a new date/time) before generating the replacement cookies (with re-computed authentication fields) and serving them to the client. The names of corresponding pages (for history cookies) and cacheable objects (for cache cookies) would likewise be updated.

In other embodiments of the invention, cookie updates may involve other action. For example, in an embodiment in which the ID field is updated each session (instead of or in addition to an age field), an entirely new identifier record may be generated. After operation 364, the method ends.

In operation 370, the server determined that at least one of the reinforced cookies was not produced by the client, was inconsistent with the others, or does not match what the server expected to receive. The server therefore investigates a specific possible threat by determining whether it has received only one or both of the reinforced HTTP cookies, and whether they are consistent and current. If this is the case, the method continues at operation 372; otherwise, the method advances to operation 380.

In operation 372, the web server considers whether the client is a valid client or is an attacker who has stolen one or more of a valid client's reinforced HTTP cookies. For example, an attacker operating a packet sniffer may be able to detect the HTTP cookies in transit (e.g., at a public Wifi hotspot), and copy them for a possible spoofing operation. Or, the attacker may conduct a cross-site scripting operation to try to obtain cookies that would not ordinarily be reported by a client.

However, possession of only the reinforced HTTP cookies also matches the cookie configuration that would be expected of a valid client that has cleared its history and cache, but not its cookies. Therefore, the web server may take other action to further authenticate or verify that the current connection is from a valid user.

In some embodiments of the invention, the web server may request or probe the client for other cookies—cookies that may or may not have been generated from the user's unique identifier record. For example, during a previous visit in which the client was successfully validated or authenticated, the server (or an associated server) may have served one or more cookies tied to very specific paths within the server (e.g., www.example.com./pathX/pathY/specific-object).

An attacker who was able to steal one or more traditional cookies from a victim may have only been able to obtain more general cookies (e.g., for a path such as www.example.com/object). If the current connection is from such an actor, the client will not be able to produce the specific cookie(s).

If the nature of the current client still cannot be ascertained with confidence, yet further authentication measures may be taken, the target user account may be suspended, etc.

After operation 372, the illustrated method may end unless the connecting client is deemed to be valid. In this case, in operation 364, new or updated reinforced cookies are generated and served to the client.

At operation 380, the server has determined that at least one of the reinforced cookies was not produced by the client, was inconsistent with the others, or does not match what the server expected to receive. Therefore, the server investigates one possible threat by determining whether it has received only domain-based reinforced cookies. If this is the case, the method continues at operation 382; otherwise, the method advances to operation 390.

In operation 382, the web server considers whether a valid client has been the victim of a DNS poisoning attack, in which it was lured to a web site through malicious alteration of a DNS lookup and duped into revealing its domain-based cookies. If this is the case, the client now attempting to connect may be the attacker.

It is unlikely that a valid client would have cleared its address-based HTTP, history and cache cookies, and retained the domain-based cookies. Therefore, the server may have a relatively high degree of confidence that the current connection is from a malicious actor. Therefore, it may require additional authentication (e.g., username and password, digital certificate) before allowing the session, or may reject the session, the true user may be notified of the attack, security personnel may be alerted (e.g., to augment security procedures, to monitor for other attacks), access to the target user account may be suspended, etc.

If the client is determined to be a valid client, the web server may update the user's identifier and issue updated reinforced cookies. Otherwise, after operation 382, the method may end.

In operation 390, the cookie configuration does not match any of the primary cyber threats the web server currently tests for (i.e., machine cloning, DNS poisoning, HTTP cookie theft). However, in some embodiments of the invention, the server may test for additional threats and/or may take specific action to protect a user account (e.g., suspend access to the account, contact the owner by telephone or other verifiable means). After operation 390, the method ends.

Figure 4:
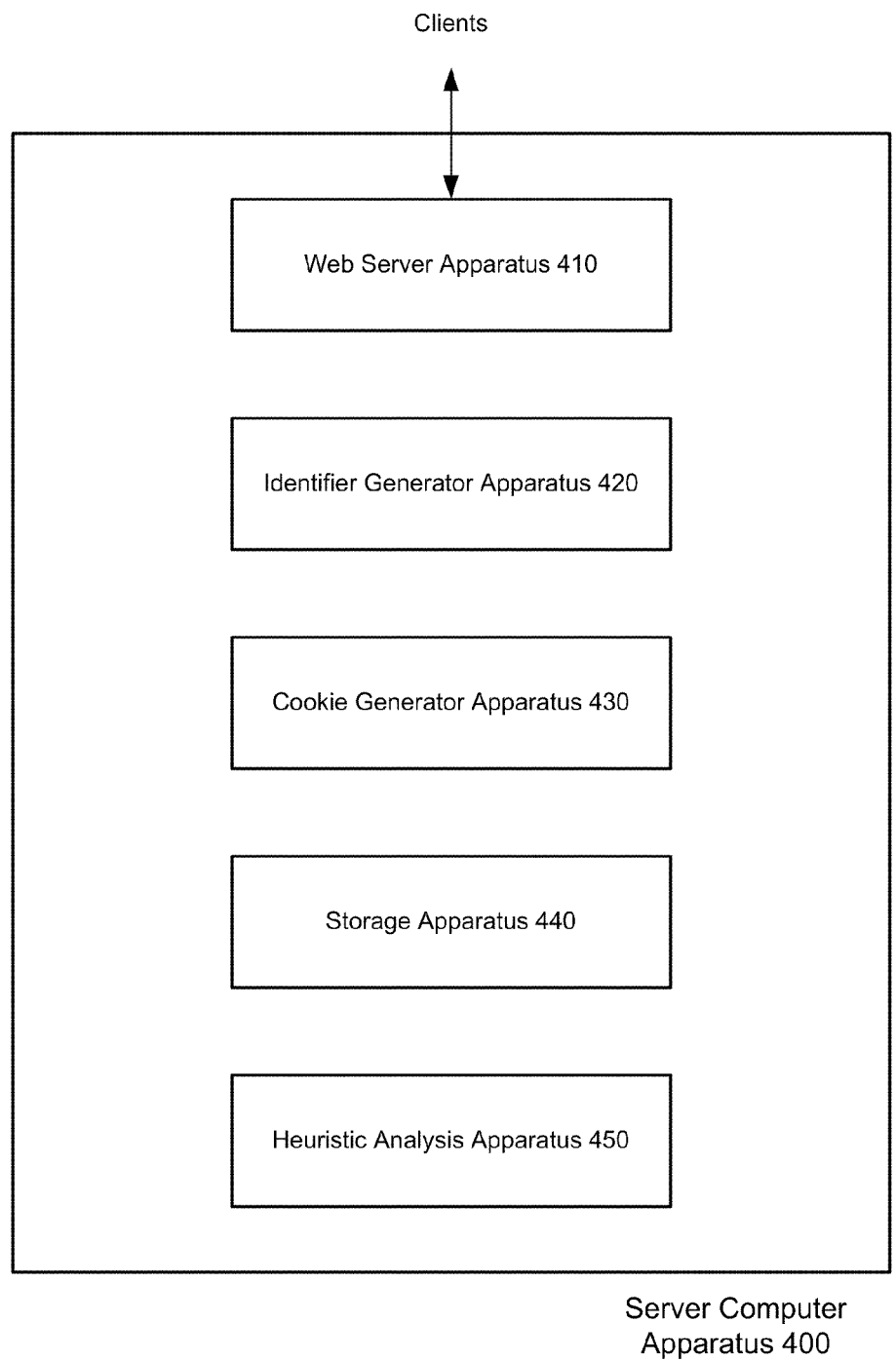
FIG. 4 is a block diagram of apparatus for detecting a cyber threat, according to some embodiments of the invention.

FIG. 4 is a block diagram of apparatus for detecting a cyber threat, according to some embodiments of the invention. In these embodiments, server computer apparatus 400 comprises web server apparatus 410, identifier generator apparatus 420, cookie generator apparatus 430, storage apparatus 440 and heuristic analysis apparatus 450.

Web server apparatus 410 is adapted to receive and manage HTTP and/or other types of communication sessions with clients. Apparatus 410 may receive and respond to requests for web pages, objects, controls and/or other content that can be presented to a user via a client browser.

Identifier generator apparatus 420 is adapted to assemble unique identifiers for individual users. As described previously, an identifier may comprise various data that will be used to generate reinforced cookies. In addition to, or instead of, assembling entire identifiers, apparatus 420 may assemble an identifier template for a user. An identifier template may comprise one or more values that will be common to all reinforced cookies generated from the template (e.g., ID, age), but may comprise one or more other fields that are not populated until the cookies are actually generated, and that will have different values for different cookies (e.g., cookie type, authentication).

Multiple identifiers (or identifier templates) may be valid for a given user at one time. For example, in an embodiment of the invention in which identifiers include values that identify the user's client device, browser or other operating parameter, multiple identifiers may be generated to allow generation and tracking of reinforced cookies on different devices, through different browsers, etc.

Cookie generator apparatus 430 is adapted to generate one or more reinforced cookies from an identifier or identifier template produced by identifier generator apparatus 420. Apparatus 430 may generate domain-based and/or address-based HTTP cookies, history cookies, cache cookies and/or other types of cookies hereafter developed.

In some embodiments of the invention, functionality of identifier generator apparatus 420 and cookie generator apparatus 430 may be combined into one apparatus. In other embodiments of the invention, multiple instances or types of cookie generator apparatuses may be implemented (e.g., one for each type or version of cookie).

In yet other embodiments of the invention, other apparatus may be implemented to perform some of the tasks involved in generating an identifier, identifier template or a cookie. For example, a cryptographic or security apparatus may be implemented to generate authentication values within one or more types of cookies.

Storage apparatus 440 is adapted to store data for verifying a client's cookies upon a subsequent visit. Thus, apparatus 440 may store identifiers, identifier templates, cookies, and/or other information related to the generation and verification of cookies.

Heuristic analysis apparatus 450 is adapted to examine the cookie configuration of a client attempting to establish a session with server computer apparatus 400. Thus, apparatus 450 may communicate with the client to receive traditional cookies and probe for history and cache cookies (or the web server apparatus or other apparatus may communicate with the client and pass relevant information to the heuristic analysis apparatus.

As described above, heuristic analysis apparatus 450 will determine which (if any) of the reinforced cookies are held by the client, and whether they are consistent and correct (e.g., correct age, correct values), and whether the configuration is likely to indicate some type of cyber attack or threat.

Based on the analysis by apparatus 450, various action may be taken such as allowing the client session to continue normally, restricting the client's access, rejecting the client's connection, suspending access to a user account, etc.

Figure 5:
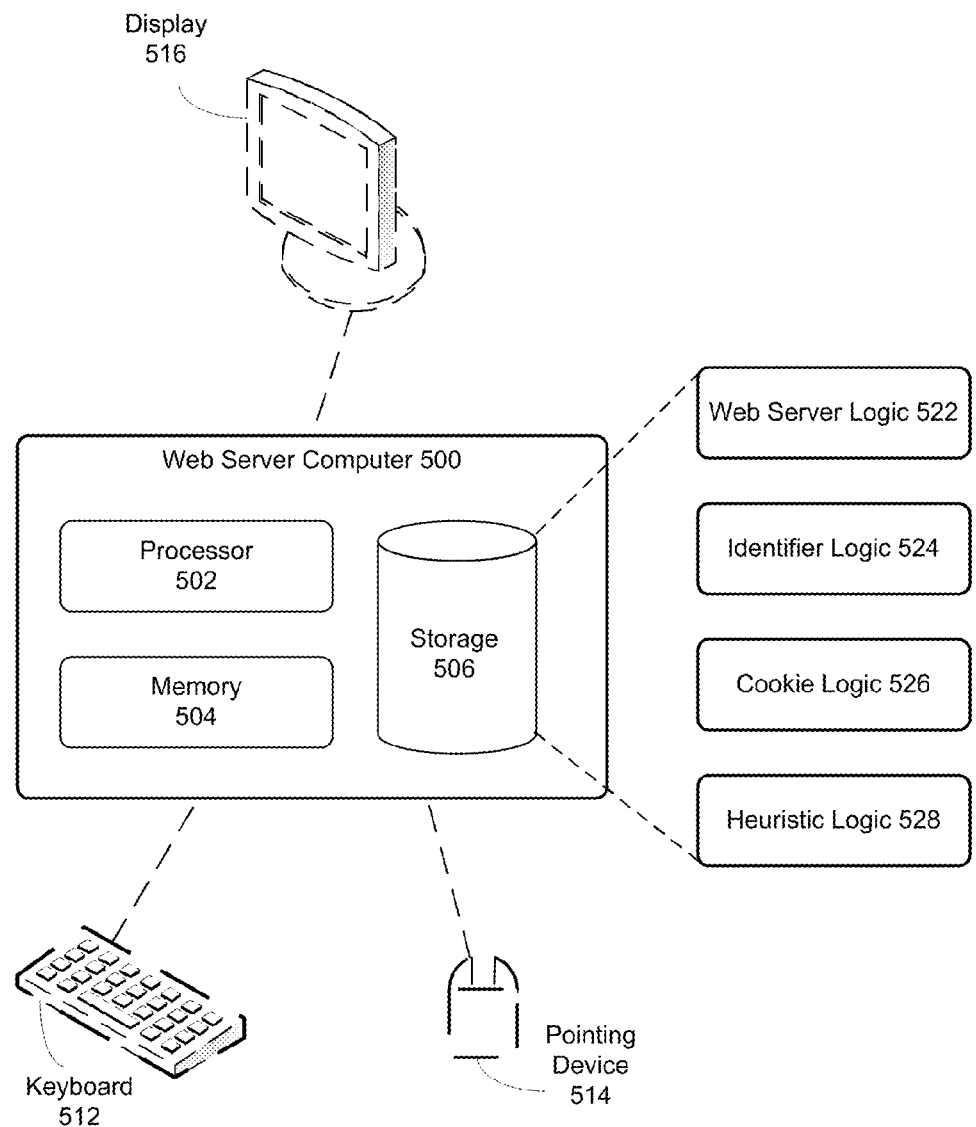
FIG. 5 is a block diagram of a computing device for detecting a cyber threat, according to some embodiments of the invention.

FIG. 5 is a block diagram of a computing device for detecting a cyber threat, according to some embodiments of the invention.

Web server computer 500 of FIG. 5 comprises processor 502, memory 504 and storage 506, which may comprise one or more optical and/or magnetic storage components. Web server computer 500 may be coupled (permanently or transiently) to keyboard 512, pointing device 514 and display 516.

Storage 506 of the network intermediary stores various logic that may be loaded into memory 504 for execution by processor 502. Such logic includes web server logic 522, identifier logic 524, cookie logic 526 and heuristic logic 528.

Web server logic 522 comprises processor-executable instructions for establishing, maintaining and terminating communication sessions with client devices, and for serving web pages and other content for presentation to users via the client devices.

Identifier logic 524 comprises processor-executable instructions for assembling, modifying and maintaining identifiers and/or identifier templates for generating unique reinforced cookies.

Cookie logic 526 comprises processor-executable instructions for generating one or more types of reinforced cookies from a unique identifier or identifier template, and for facilitating their storage on a client device.

Heuristic logic 528 comprises processor-executable instructions for examining the cookie configuration of a client device and determining whether the client is likely to have conducted or been the victim of a cyber attack.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of heuristically identifying a cyber threat at a computer server, the method comprising:
serving a collection of reinforced cookies for storage during a first communication session with a first client computing device;
receiving a request for a second communication session from a second client computing device purporting to be the first client computing device; and
comparing a configuration of reinforced cookies on the second client computing device to configurations indicative of one or more cyber threats;
wherein each said reinforced cookie in the collection of reinforced cookies is generated from a unique identifier associated with a user of the first client computing device; and
wherein each said reinforced cookie comprises one or more of:
an HTTP (Hyper Text Transport Protocol) cookie;
a history cookie; and
a cache cookie.

2. The method of claim 1, wherein the one or more cyber threats comprise:
cookie theft;
DNS (Domain Name Service) poisoning; and
machine cloning.

3. The method of claim 1, wherein said comparing comprises:
determining whether the second client computing device comprises only a set of reinforced HTTP cookies, and no history cookie and no cache cookie.

4. The method of claim 1, wherein said comparing comprises:
determining whether the second client computing device comprises the collection of reinforced cookies transmitted to the first client computing device during said serving.

5. The method of claim 1, wherein the configuration of reinforced cookies on the second client computing device comprises a subset of the collection of reinforced cookies.

6. The method of claim 1, further comprising:
serving to the second client computing device an updated collection of reinforced cookies to replace the collection of reinforced cookies.

7. The method of claim 1, wherein said comparing comprises:
determining whether the second client computing device comprises only a set of domain-based cookies, and no address-based cookies.

8. The method of claim 7, wherein:
a domain-based cookie comprises a cookie encoded with a domain of the server computer; and
an address-based cookie comprises a cookie encoded with an address of the server computer.

9. The method of claim 1, further comprising:
comparing the configuration of reinforced cookies on the second client computing device to configurations indicative of valid user activity.

10. The method of claim 9, wherein said configurations indicative of valid user activity include at least one of:
- clearing an HTTP cookie;
- clearing a browser history; and
- clearing a browser cache.

11. The method of claim 1, wherein a history cookie comprises an entry in a browser history that identifies a specific page of content.

12. The method of claim 11, wherein said serving comprises:
- serving the first client computing device a dummy page of content for processing by a browser program executing on the first client computing device;
- wherein the dummy page comprises code configured to cause the browser program to attempt to load the specific page of content.

13. The method of claim 12, wherein the specific content page of content is not served to the first client computing device.

14. The method of claim 1, wherein a cache cookie comprises an entry in a browser cache that identifies a specific content object.

15. The method of claim 14, wherein said serving comprises:
- serving the first client computing device a dummy page of content for processing by a browser program executing on the first client computing device;
- wherein the dummy page comprises code configured to cause the browser program to attempt to load the specific content object.

16. The method of claim 15, wherein the specific content object is not served to the first client computing device.

17. The method of claim 1, further comprising, prior to said serving:
- generating the unique identifier to comprise an ID of the user and one or more additional data fields; and
- encoding a subset of the data fields of the unique identifier into each of the reinforced cookies.

18. The method of claim 17, wherein the one or more additional data fields comprise at least one of:
- an ID of the first client computing device;
- an age; and
- an authentication value;
- wherein the authentication value comprises a value derived from the ID of the user and the one or more additional data fields.

19. A computer-readable medium storing instructions that, when executed by a computer, cause the computer to perform a method of heuristically identifying a cyber threat at the computer, the method comprising:
- serving a collection of reinforced cookies for storage during a first communication session with a first client computing device;
- receiving a request for a second communication session from a second client computing device purporting to be the first client computing device; and
- comparing a configuration of reinforced cookies on the second client computing device to configurations indicative of one or more cyber threats;
- wherein each said reinforced cookie in the collection of reinforced cookies is generated from a unique identifier associated with a user of the first client computing device; and
- wherein each said reinforced cookie comprises one or more of:
  - an HTTP (Hyper Text Transport Protocol) cookie;
  - a history cookie; and
  - a cache cookie.

20. An apparatus for detecting a cyber threat on a client computing device, the apparatus comprising:
- a web server configured to serve electronic content to client computing devices;
- a cookie generator configured to generate a collection of reinforced cookies for storage on a client computing device, including one or more of:
  - a reinforced HTTP (Hyper Text Transport Protocol) cookie;
  - a reinforced history cookie; and
  - a reinforced cache cookie; and
- a heuristic analysis engine configured to compare a configuration of reinforced cookies detected on a client computing device with configurations indicative of cyber threats.

21. The apparatus of claim 20, wherein a reinforced cookie comprises:
- an ID of a user;
- an age of the cookie;
- a type of the cookie; and
- an authentication value for authenticating the reinforced cookie.

22. The apparatus of claim 20, further comprising:
- an identifier generator configured to assemble a unique identifier associated with a user of a client computing device.

23. The apparatus of claim 22, wherein the cyber threats include one or more of:
- cookie theft;
- DNS (Domain Name Service) poisoning; and
- machine cloning.

* * * * *